(12) United States Patent
Hegde et al.

(10) Patent No.: US 9,910,909 B2
(45) Date of Patent: Mar. 6, 2018

(54) METHOD AND APPARATUS FOR EXTRACTING JOURNEY OF LIFE ATTRIBUTES OF A USER FROM USER INTERACTIONS

(71) Applicant: 24/7 CUSTOMER, INC., Campbell, CA (US)

(72) Inventors: Darshan Hegde, Bangalore (IN); Kranthi Mitra Adusumilli, Hyderabad (IN); Subhash Ramchandra Kulkarni, Bangalore (IN); Ravi Prakash, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 693 days.

(21) Appl. No.: 14/250,342

(22) Filed: Apr. 10, 2014

(65) Prior Publication Data

US 2014/0222823 A1 Aug. 7, 2014

Related U.S. Application Data

(63) Continuation-in-part of application No. 14/161,071, filed on Jan. 22, 2014.

(60) Provisional application No. 61/814,011, filed on Apr. 19, 2013, provisional application No. 61/755,868, filed on Jan. 23, 2013, provisional application No. 61/769,067, filed on Feb. 25, 2013.

(51) Int. Cl.
*G06Q 30/02* (2012.01)
*G06F 17/30* (2006.01)

(52) U.S. Cl.
CPC ... *G06F 17/30598* (2013.01); *G06Q 30/0201* (2013.01)

(58) Field of Classification Search
CPC ............. G06F 13/10; G06F 17/30598; G06Q 30/0201; G06Q 30/02; G06Q 30/0613; G06Q 30/01
USPC ..................... 705/7.29, 26.41, 319
See application file for complete search history.

(56) References Cited

U.S. PATENT DOCUMENTS

| | | | |
|---|---|---|---|
| 6,167,395 A * | 12/2000 | Beck | ................. G06F 17/30017 |
| 6,826,592 B1 | 11/2004 | Mathews et al. | |
| 7,191,129 B2 | 3/2007 | Brown et al. | |
| 7,464,050 B1 | 12/2008 | Deaton et al. | |
| 7,464,092 B2 | 12/2008 | Lee et al. | |
| 7,769,701 B2 | 8/2010 | Carus et al. | |
| 7,886,343 B2 | 2/2011 | Sullivan et al. | |
| 8,121,890 B2 | 2/2012 | Pinhanez | |
| 8,171,044 B2 | 5/2012 | Daigle | |

(Continued)

FOREIGN PATENT DOCUMENTS

WO  WO-2002101501  12/2002

*Primary Examiner* — Matthew Gart
*Assistant Examiner* — Stephen S Swartz
(74) *Attorney, Agent, or Firm* — Perkins Coie LLP; Michael A. Glenn

(57) ABSTRACT

Embodiments of the invention relate to managing user interactions and, more particularly, to performing analysis on data generated by user interactions. Embodiments of the invention use text mining to extract personal information of users from user interactions automatically. A topic model is used to reduce the number of dimensions required to represent the text, yet all the information of interest is highly pronounced. This enables a lower dimensional representation of the data leading to significantly faster computations.

11 Claims, 5 Drawing Sheets

(56) References Cited

U.S. PATENT DOCUMENTS

| | | |
|---|---|---|
| 8,229,401 B2 | 7/2012 | Elsey et al. |
| 8,326,777 B2 | 12/2012 | Zhang et al. |
| 8,370,155 B2 | 2/2013 | Byrd et al. |
| 8,411,830 B2 | 4/2013 | Gilbert et al. |
| 8,689,311 B2 | 4/2014 | Blinn et al. |
| 8,798,242 B1 * | 8/2014 | Sankaranarayanan ..................... H04M 3/42221 379/265.03 |
| 8,892,446 B2 * | 11/2014 | Cheyer ............... G06F 17/3087 704/246 |
| 9,318,108 B2 * | 4/2016 | Gruber ................ G10L 15/1815 |
| 2003/0038840 A1 | 2/2003 | Stern et al. |
| 2004/0064351 A1 | 4/2004 | Mikurak et al. |
| 2005/0192792 A1 * | 9/2005 | Carus .................. G06F 17/2735 704/2 |
| 2005/0210016 A1 * | 9/2005 | Brunecky ......... G06F 17/30011 |
| 2005/0210047 A1 * | 9/2005 | Hayes ............. G06F 17/30557 |
| 2005/0228774 A1 | 10/2005 | Ronnewinkel |
| 2006/0149555 A1 * | 7/2006 | Fabbrizio .............. G10L 15/063 704/275 |
| 2006/0167899 A1 * | 7/2006 | Nagahashi ........ G06F 17/30265 |
| 2006/0184410 A1 | 8/2006 | Ramamurthy et al. |
| 2006/0265362 A1 * | 11/2006 | Bradford ........... G06F 17/30675 |
| 2007/0288454 A1 | 12/2007 | Bolivar et al. |
| 2007/0288559 A1 * | 12/2007 | Parsadayan ............ G06Q 30/02 709/204 |
| 2008/0019500 A1 | 1/2008 | Torres et al. |
| 2009/0016522 A1 | 1/2009 | Torres et al. |
| 2009/0326947 A1 | 12/2009 | Arnold et al. |
| 2011/0173077 A1 | 7/2011 | Patel et al. |
| 2011/0238410 A1 * | 9/2011 | Larcheveque ...... G06F 17/2785 704/9 |
| 2011/0282758 A1 | 11/2011 | Jacobi et al. |
| 2012/0166250 A1 | 6/2012 | Ferrante et al. |
| 2012/0166345 A1 * | 6/2012 | Klemm ................ G06Q 30/016 705/304 |
| 2012/0233258 A1 | 9/2012 | Vijayaraghavan et al. |
| 2012/0311684 A1 | 12/2012 | Paulsen et al. |
| 2013/0297721 A1 | 11/2013 | Chen et al. |
| 2013/0299569 A1 | 11/2013 | Gentile et al. |
| 2013/0304900 A1 | 11/2013 | Trabelsi et al. |

* cited by examiner

50a — Just Married
50b — Braxton: May I know the reason of changing your last name.
You: Marriage 51a — Long Married
51b — Patsy: Just to clarify, are you already an authorized user on your account?
You: I have a ☐. My husband has a separate ☐ Neither one of us are listed as authorized users of our separate accounts. We want a new joint card that is separate from our existing Capital One accounts.

52a — Daughters Marriage
52b — You: Robin Foster; I have been with you all for years. I have paid on time. I have been receiving offers from other credit card companies. I would rather increase my limit on this card instead of getting a new card. My daughter is getting married and I would like to use this card for incidentals.

53a — New Graduate
53b — You: I graduated from pharmacy school in May of 2011. I just finished up a year of post-graduate residency work and will be starting my job August 20th as a clinical pharmacist. I am going from student to resident to full time pharmacist and feel that with a pharmacist's salary, I should be able to have an increased credit limit.

54a — Divorced
54b — You: Hi Addis, what number do I call to change the name on my account? I am divorced and want to go back to my maiden name.

55a — Joining College
55b — You: Yes how do I ask for a credit increase? My youngest is going to college this month and I am just curious if this is possible?

*FIG. 5*

METHOD AND APPARATUS FOR EXTRACTING JOURNEY OF LIFE ATTRIBUTES OF A USER FROM USER INTERACTIONS

CROSS REFERENCE TO RELATED APPLICATIONS

This application claims priority to U.S. provisional patent application Ser. No. 61/814,011, filed Apr. 19, 2013, and is a continuation-in-part of U.S. patent application Ser. No. 14/161,071, filed Jan. 22, 2014, which application claims priority to U.S. provisional patent application Ser. No. 61/755,868, filed Jan. 23, 2013, and to U.S. provisional patent application Ser. No. 61/769,067, filed Feb. 25, 2013, each of which application is incorporated herein in its entirety by this reference thereto.

FIELD

The invention relates to managing user interactions. More particularly, the invention relates to performing analysis on data generated by user interactions.

BACKGROUND

People often require assistance when performing certain tasks. They may seek assistance from agents, where they interact with the agents using a medium such as textual chats; voice chats, e.g. over a telephone network, a cellular network, a Voice over Internet Protocol (IP) (VoIP) network, etc.; an online forum; a social network; and so on. Such assistance may be requested in connection with purchasing specific items, inquiring about items, troubleshooting issues they face, and so on.

In these interactions, individuals might share information related to their personal life with the agents. It would be advantageous if such information could be used to understand the persona of the individual better and build a profile of them, for example to tailor the interactions and/or services and products which may be offered to the individual.

SUMMARY

Embodiments of the invention relate to managing user interactions and, more particularly, to performing analysis on data generated by user interactions. Embodiments of the invention use text mining to extract personal information of users from user interactions automatically. A topic model is used to reduce the number of dimensions required to represent the text, yet all the information of interest is highly pronounced. This enables a lower dimensional representation of the data leading to significantly faster computations.

BRIEF DESCRIPTION OF THE DRAWINGS

FIG. 5 is an example of identification of user's specific personal topics based on chat data according to the invention;

DETAILED DESCRIPTION

Embodiments of the invention relate to managing user interactions and, more particularly, to performing analysis on data generated by user interactions. Embodiments of the invention use text mining to extract personal information of users from user interactions automatically. A topic model is used to reduce the number of dimensions required to represent the text, yet all the information of interest is highly pronounced. This enables a lower dimensional representation of the data leading to significantly faster computations.

Figure 1:
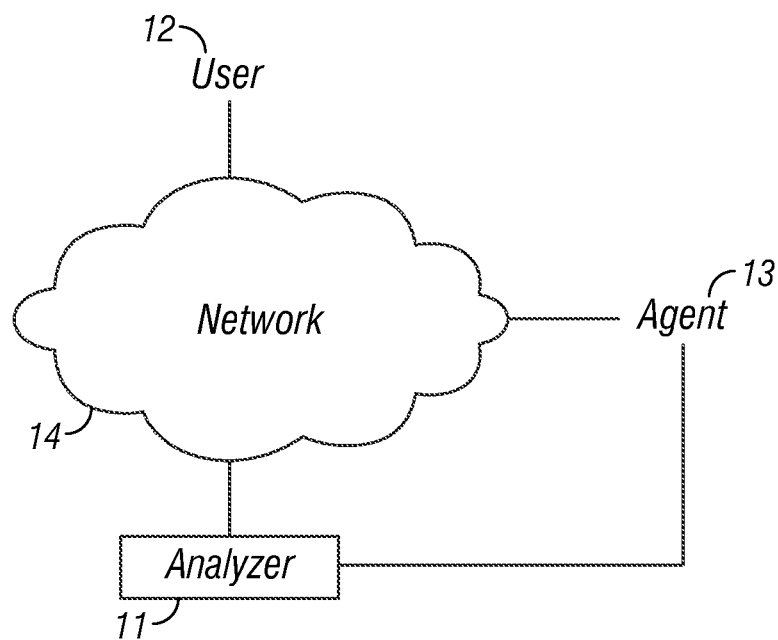
FIG. 1 is a block schematic diagram showing an architecture used to extract personal information about a user from user interactions according to the invention.

FIG. 1 is a block schematic diagram showing an architecture used to extract personal information about a user from user interactions according to the invention. The architecture comprises a network 14 that allows at least one user 12 to interact with at least one agent 13. The network may be any of an Internet protocol (IP) based network; a telephone network, such as a public switched telephone network (PSTN); a mobile technology based network; and so on. The interaction between the agent and the user may be any of a text chat based interaction; a voice-based chat, such as a VoIP based service; a voice-based interaction, such as performed over a telephone or a cellular network; a social network based interaction; a forum based interaction; and so on.

An analyzer, connected to the network, extracts the interaction between the user and agent from the network, e.g. chat text, etc. for a current interaction is ported to the analyzer which consumes the data. While the interaction happens, each part of the interaction, i.e. a line of chat or a specific instance of single speech utterance, etc. is stored in a centralized data store system to which all data generated from multiple systems, including browsing behavior, call flows, system state changes, etc. is stored.

Further, the store can include a complete interaction, such as a complete chat or voice interaction between an agent and a caller, instead of a portion of an interaction at a granular level, as discussed above. If the data exists in disparate sources, application of appropriate processes and technology consolidates the interaction data into a single repository, such as a virtual repository, i.e. a set of multiple repositories or an actual single schema on a single set of servers.

While storing the information, appropriate labels and/or keys are attached with interaction specific information which identifies what the data means. The analyzer crawls through all of the available data and, based on the labels and/or keys, extracts the required interaction data.

In an embodiment of the invention, the analyzer is connected to the agent and fetches the interaction from the agent. During an interaction or just after an interaction, the agent or the system handling the interaction can make appropriate annotations and/or comments through any of various mechanisms, such as through a post-interaction survey, wrap-up forms, interaction notes, etc. These entries into the system can also be appropriately configured to flow into the single repository. This data is used to label the interaction appropriately, e.g. if the chat is related to a person shifting homes or graduating, etc. The interaction systems themselves can make such labeling much easier, for example, by providing a highlighting tool to the agent, where appropriate sections in the chat are highlighted and, on highlighting, the highlighted information is stored as part of the wrap-up form, with appropriate labels and/or keys.

Further, the capability of the analyzer module can be extended such that entry of data into the system by the agent is more convenient. For example, the analyzer can identify appropriate key words or utterances when they occur during an interaction, i.e. in real time, and ask the agent if this is appropriate information for the particular interaction. The agent can confirm that the words are appropriate information or the agent can decide to ignore the suggestion if the words are not appropriate information. In another embodiments of the invention, the agent is given a selection of a drop down from which appropriate information can be selected and associated with the chat during completion of the form itself.

Once the agent enters information during or after the interaction, data flows into the central data repository. By design of the data repository, this data element is associated with an appropriate key. The analyzer can then look through all of the data and extract this information as appropriate.

In embodiments of the invention, the analyzer fetches the interaction in the form of text. If the interaction is voice-based, the interaction is transcribed into text and provided to the analyzer. Customer interaction with the system can be speech based, for example when the user calls and interacts with the IVR system through a direct or open dialog; when the user talks to an agent; when the user talks to a self-serve tool which recognizes the speech and helps accordingly; as part of a voice-based search during browsing; and so on. In such cases, while embodiments of the invention provide for performing extraction of the required information directly on voice-based data to understand customer's context, embodiments of the invention can extract information from the transcript data which in form of text. As used herein, the term transcript refers to text data that is obtained by converting the speech interaction via an appropriate automatic speech recognition (ASR) engine. The ASR engine can be any high accuracy system which takes speech data and outputs text data in text format that is reflective of the speech input. Those skilled in the art will appreciate that such approach does not rule out the possibility of inclusion of speech-based data extraction.

In another embodiment of the invention, the analyzer fetches the interaction from a storage medium, such as a server and/or database in which the interactions are stored.

In machine learning and natural language processing, a topic model is a type of statistical model for discovering the abstract topics that occur in a collection of documents. Intuitively, given that a document is about a particular topic, one would expect particular words to appear in the document more or less frequently: "dog" and "bone" appear more often in documents about dogs, "cat" and "meow" appear in documents about cats, and "the" and "is" appear equally in both. A document typically concerns multiple topics in different proportions; thus, in a document that is 10% about cats and 90% about dogs, there would probably be about nine times more dog words than cat words. A topic model captures this intuition in a mathematical framework, which allows examining a set of documents and discovering, based on the statistics of the words in each, what the topics might be and what each document's balance of topics is.

The analyzer performs topic modeling by extracting lines from the text. In embodiments of the invention, the extracted lines are referred to herein as anchored text lines and are indicative of personal information that is present in the anchored text lines (see FIG. 5). The analyzer identifies the anchored text lines by checking for specific keywords which may be present when a user is mentioning personal information. The analyzer applies a suitable machine learning or statistical technique, such as k nearest neighbor (K-NN Classifier) or a Naïve Bayes classifier to the anchored text lines to discover information present in the anchored text lines.

The data required to identify the personal information is gathered from various sources, such as user's past interactions or user profile and/or from current interactions, e.g. as shown FIG. 5 where a user is chatting with the chat agent. From such user-agent dialog, the text data reveals, for example, that the user is requesting an increase in his credit limit to meet his daughter's marriage expenses. The analyzer fetches texts and assigns the text, if possible, to a specific personal information topic, such as user's marital status, e.g. whether the user is newly married or divorced (see FIG. 6, discussed below).

In an embodiment of the invention, a user profile is continuously generated by evaluating a plurality of different sets of data collected across a plurality of channels, multiple data sources, and unique identifiers comprising all of unique data which corresponds to unique identification parameters of the user, aggregate data, transaction data, and interaction data. The profile includes information that uniquely identifies a user as well as the user's previous interaction experience and personal information which is used to classify the user. In this way, the user profile is continuously updated with information generated in accordance with the invention disclosed herein. Further details on profiles are found in U.S. patent application Ser. No. 14/161,071, filed Jan. 22, 2014, which application is incorporated herein in its entirety by this reference thereto.

In a preferred embodiment of the invention, the analyzer uses the k nearest neighbor approach. In pattern recognition, the k-Nearest Neighbors algorithm (k-NN) is a non-parametric method used for classification and regression. In both cases, the input consists of the k closest training examples in the feature space. The output depends on whether k-NN is used for classification or regression:

In k-NN classification, the output is a class membership. An object is classified by a majority vote of its neighbors, with the object being assigned to the class most common among its k nearest neighbors, where k is a positive integer, typically small. If k=1, then the object is simply assigned to the class of that single nearest neighbor.

In k-NN regression, the output is the property value for the object. This value is the average of the values of its k nearest neighbors.

k-NN is a type of instance-based learning, or lazy learning, where the function is only approximated locally and all computation is deferred until classification. The k-NN algorithm is among the simplest of all machine learning algorithms. Both for classification and regression, it can be useful to weight the contributions of the neighbors, so that the nearer neighbors contribute more to the average than the more distant ones. For example, a common weighting scheme consists in giving each neighbor a weight of lid, where d is the distance to the neighbor. The neighbors are taken from a set of objects for which the class, for k-NN classification; or the object property value, for k-NN regression, is known. This can be thought of as the training set for the algorithm, though no explicit training step is required.

Figure 6:
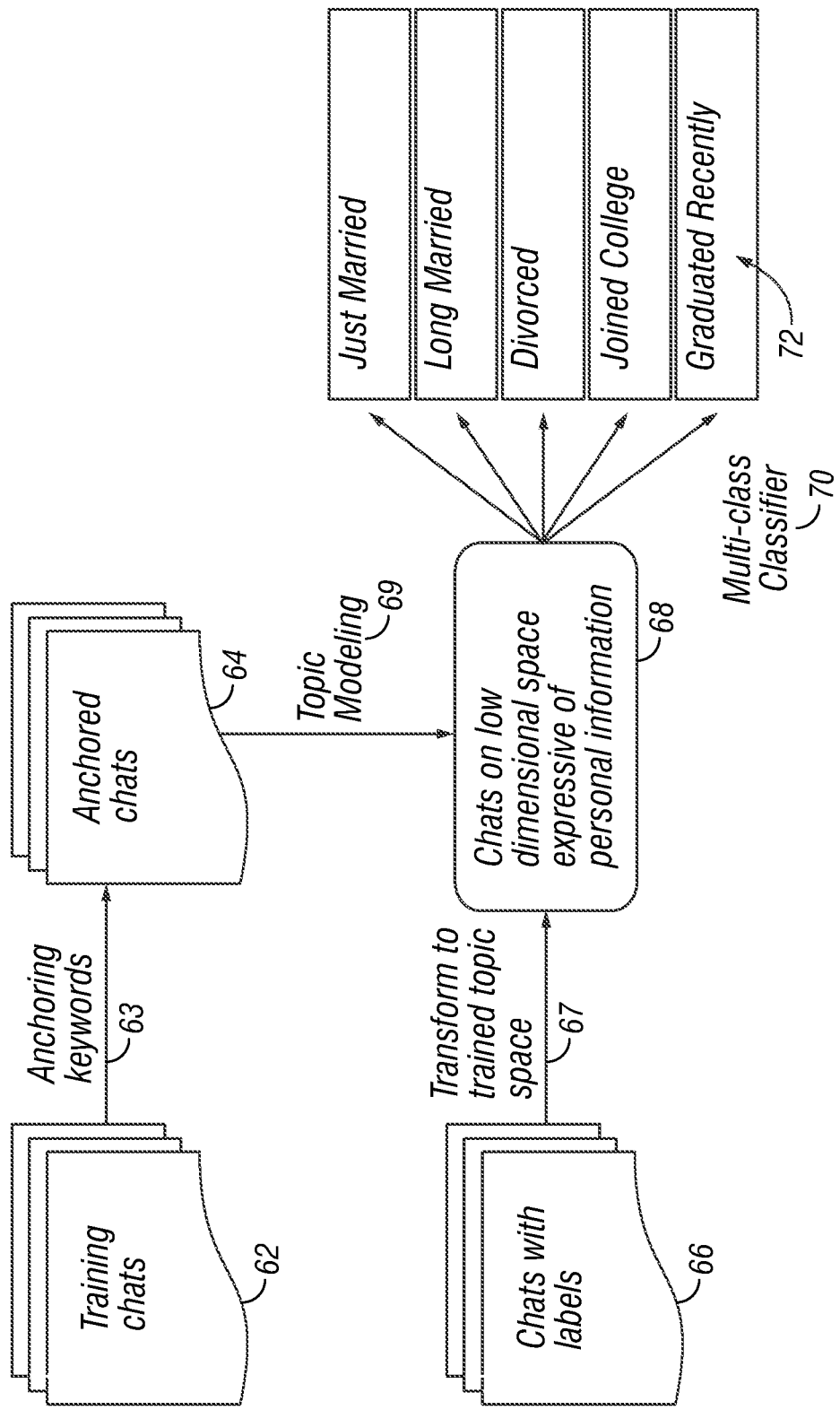
FIG. 6 is a block schematic diagram showing the identification of a user's personal information topic based on text data according to the invention.

In embodiments of the invention, when the analyzer is given a new data point, which may be an anchored text line from the text, it picks the k closest points to the new data point, determines the predominant class among the classes in the k closest points, and then assigns it to the new data point. The analyzer then assigns the user corresponding to the text to at least one class, based on the identified personal information. For example, as shown in FIGS. 5 and 6, if the text corresponding to a user's chat dialogs identifies that the user is recently married (see FIG. 5, discussed below), the user is placed in the class belonging to recently married users. The analyzer assigns texts a value of 'No Segment' class if personal information cannot be extracted from the text.

Figure 7:
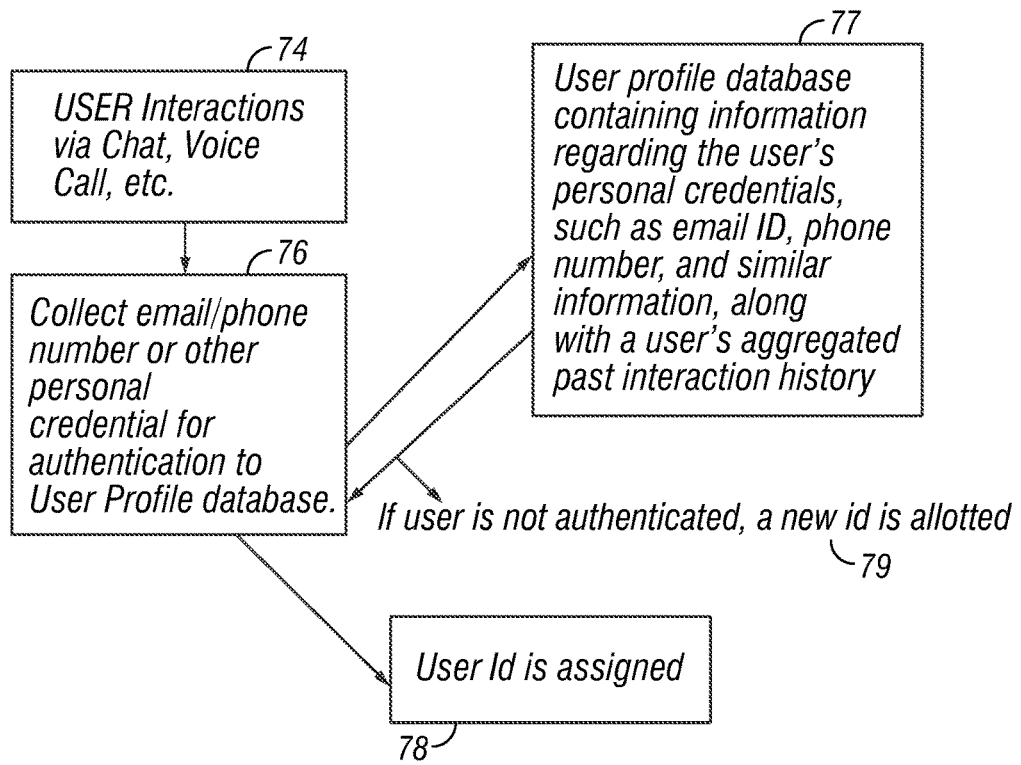
FIG. 7 is a block schematic diagram showing user identification according to the invention.

In embodiments of the invention, the analyzer associates an identification with a user (see FIG. 7 discussed below). The identification is, for example, a user ID associated with the user, a phone number, an email address, and so on, as illustrated in FIG. 7. Once the user has been identified, the analyzer also tailors the interactions with the user based on the identified personal information.

In embodiments of the invention, the analyzer performs the tasks of using the extracted personal information. However, it will be obvious to a person of ordinary skill in the art that a different module may interface with the analyzer to perform the task of using the extracted personal information in a suitable manner, as explained in greater detail below.

Consider, for example, where a user is classified as engaged. In such case, the user may be interested in looking for houses, wedding related gifts, honeymoon packages, and so on. The analyzer pushes recommendations to the user accordingly. The recommendations may be in the form of a campaign comprising of any of emails, phone calls, online advertisements, tips to agents interacting with the user, and so on.

Consider, for another example, where a user has been classified as having recently purchased a house. In such case, the analyzer provides recommendations to the user related to furnishings, interior decorators, home decor tips, and so on.

Figure 2:
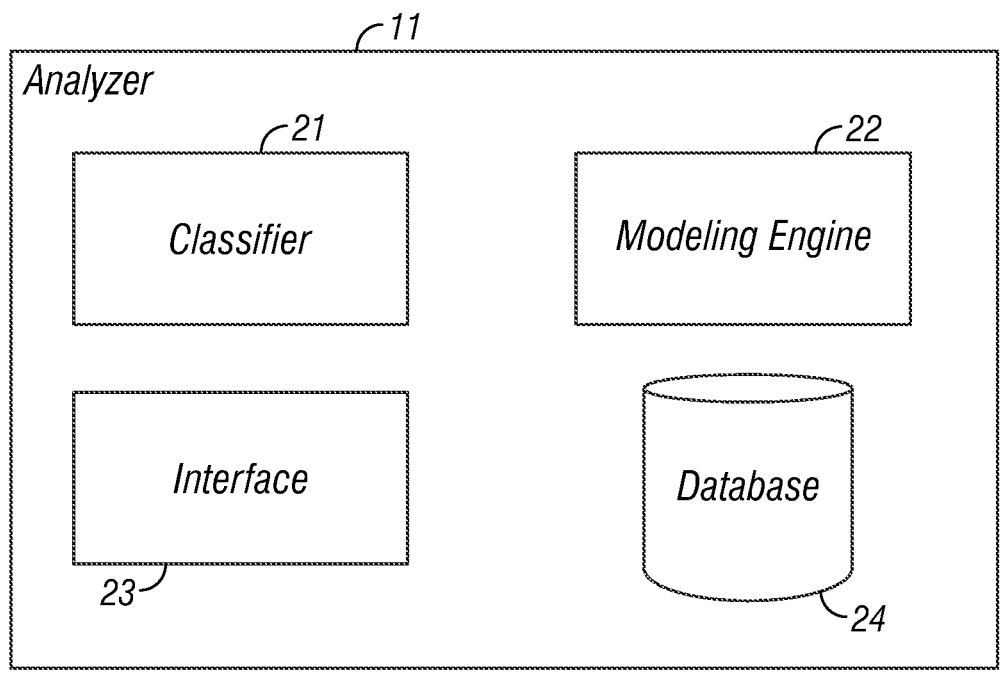
FIG. 2 is a block schematic diagram showing an analyzer configured for automatically extracting personal information of users from user interactions using a text-mining method according to the invention.

FIG. 2 is a block schematic diagram showing an analyzer configured for automatically extracting personal information of users from user interactions using a text-mining method according to the invention. In embodiments of the invention, the analyzer comprises a classifier 21, a modeling engine 22, an interface 23, and a database 24. The modeling engine and the classifier may store data in the database at pre-configured intervals or at pre-configured stages. The database may be present internal to the analyzer. In another embodiment of the invention, the database may be present external to the analyzer. The interface enables the analyzer to connect to the network. In an embodiment of the invention, the interface connects the analyzer to the agent.

The modeling engine 22 performs topic modeling on interactions which are in the form of text. The modeling engine extracts anchored text lines from the text. The modeling engine identifies the anchored text lines by checking for specific keywords which may be present when a user is mentioning personal information. The modeling engine applies a suitable statistical technique to the anchored text lines to discover information present in the anchored text lines. The modeling engine represents the text in topic space with a score along each axis, which indicates the extent to which the text contains personal information.

Based on the modeling performed by the modeling engine, the classifier 21 fetches text and assigns the text, if possible, to a specific personal information topic. In embodiments of the invention, the classifier uses the k nearest neighbor approach. In embodiments of the invention, when the classifier is given a new data point, which may be an anchored text line from the text, it picks the k closest points to the new data point, determines the predominant class among the classes in the k closest points, and then assigns it to the new data point. The classifier then assigns the user corresponding to the text to at least one class, based on the identified personal information. The classifier assigns texts a value of 'No Segment' class, if personal information may not be extracted from the text.

In embodiments of the invention, the classifier associates an identification with a user (see FIG. 6, discussed below). The identification is, for example, a user ID associated with the user, a phone number, an email address, and so on. Once the user has been identified, the classifier also tailors the interactions with the user, based on the identified personal information.

Figure 3:
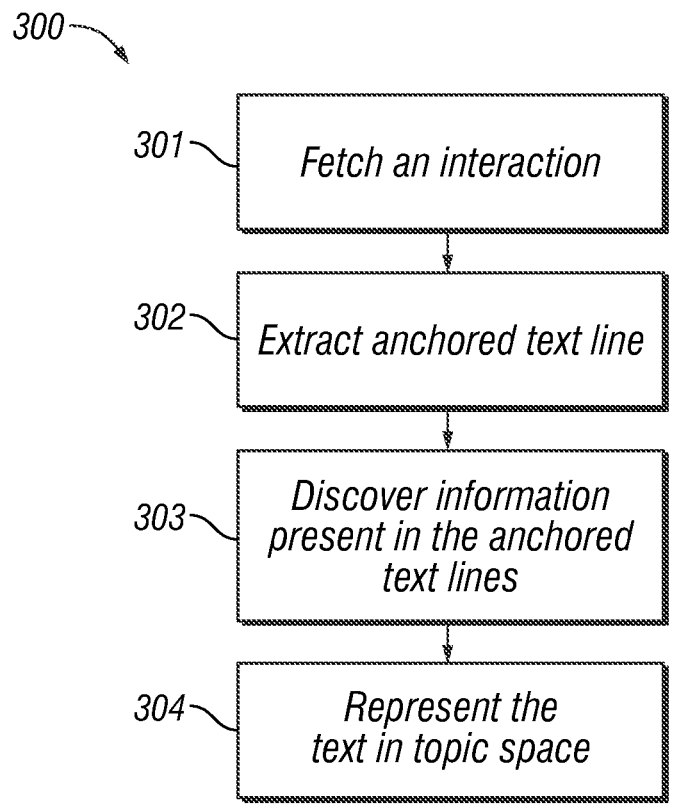
FIG. 3 is a flow diagram showing a process for topic modeling according to the invention.

FIG. 3 is a flow diagram showing a process for topic modeling according to the invention. The analyzer fetches (301) an interaction. The analyzer may extract the interaction from the network. In an embodiment of the invention, the analyzer is connected to the agent and fetches the interaction from the agent.

The analyzer fetches the interaction, for example, in the form of text. If the interaction is voice-based, the interaction is transcribed into text and provided to the analyzer. In an embodiment of the invention, the analyzer fetches the interaction from a storage medium, such as a server and/or database where the interactions are stored.

The analyzer also performs topic modeling by extracting (302) anchored text lines from the text. The analyzer identifies the anchored text lines by checking for specific keywords which may be present when a user is mentioning personal information. The analyzer discovers (303) information present in the anchored text lines by applying a suitable statistical technique to the anchored text lines. The analyzer represents (304) the text in topic space with a score along each axis to indicate extent to which the text contains the personal information.

Embodiments of the invention use a topic model to reduce the number of dimensions required to represent the text, but all of the information of interest is highly pronounced. Usually, a text or a document consists of several sentences, such as in the chat in the dialogs shown in FIG. 5. For example, any piece of a text document can be represented at the topics level instead of the word level. This allows two text documents the do not share common words, e.g. one says "buy" and the other says "sell," to be regarded as similar because they share the same finance topic. This allows a lower dimensional representation of the data, which leads to significantly faster computation. For this purpose, tools such as principal component analysis, latent sematic analysis, or probabilistic latent semantic analysis are used to reduce the dimensionality to the represent the text in lower dimensions.

The various actions (300) shown in FIG. 3 may be performed in the order presented, in a different order, or simultaneously. Further, in some embodiments of the invention, some actions shown in FIG. 3 may be omitted.

Figure 4:
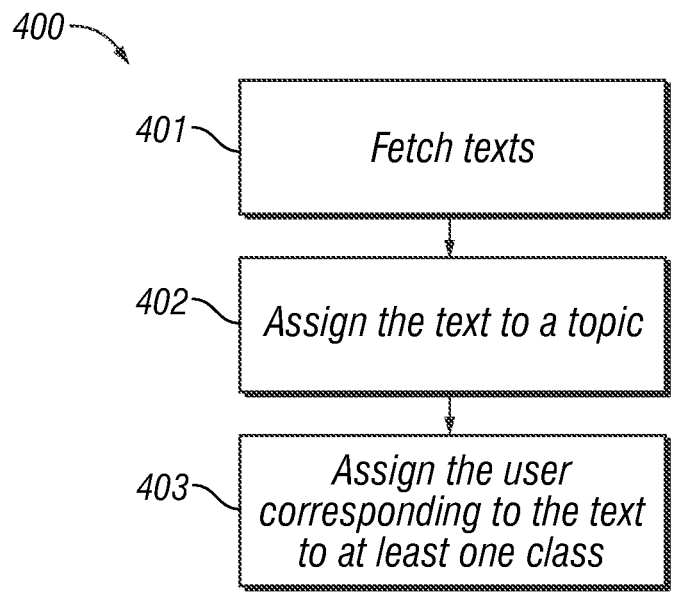
FIG. 4 is a flow diagram showing a process for automatically extracting personal information of users from user interactions using a text-mining method according to the invention.

FIG. 4 is a flow diagram showing a process for automatically extracting personal information of users from user interactions using a text-mining method according to the invention. The analyzer fetches (401) texts and assigns (402) the text, if possible, to a specific personal information topic. Based on the identified personal information, the analyzer assigns (403) the user corresponding to the text to at least one class.

The various actions (400) shown in FIG. 4 may be performed in the order presented, in a different order, or simultaneously. Further, in some embodiments of the invention, some actions shown in in FIG. 4 may be omitted.

FIG. 5 is an example of identification of user's specific personal topics based on chat data according to the invention. In FIG. 5, a classification 50a-55a is derived from a corresponding transcript containing personal information 50b-55b that is extracted from a user-agent interaction.

FIG. 6 is a block schematic diagram showing the identification of a user's personal information topic based on text data according to the invention. In FIG. 6, training chats 62 are processed to extract anchoring keywords 63, resulting in anchored chats 64. Chats with labels 66 are transformed to a trained topic space 67 and, using the anchored chats for topic modeling 69, the chats are transformed in a low dimensional space to chats that are expressive of personal information 68. A multi-class classifier 70 is then applied to the chats and personal traits of the user 72 are identified. In embodiments of the invention, a K-NN classifier, Naïve Bayes classifier, and other such similar machine learning modeling tools can be used to classify the user into one of the predefined classes such as "Just married," "Joined college," " Graduated recently," and so on.

FIG. 7 is a block schematic diagram showing user identification according to the invention. In FIG. 7, user interactions are captured 74, for example via any of chat, voice calls, etc. and the system collects email, phone, or any other personal credential to authenticate the user to the user profile data base 76. The user profile contains information regarding the user's personal credentials, such as email ID, phone number, or other such information, along with an aggregated past interaction history for the user 77. As a result, the user ID is assigned 78, where a new user ID is allotted if the user is not authenticated 78. A simple look-up is performed to check whether the user's credentials match those stored in the users' database or profile. If not, then a new User ID is assigned.

Computer Implementation

Figure 8:
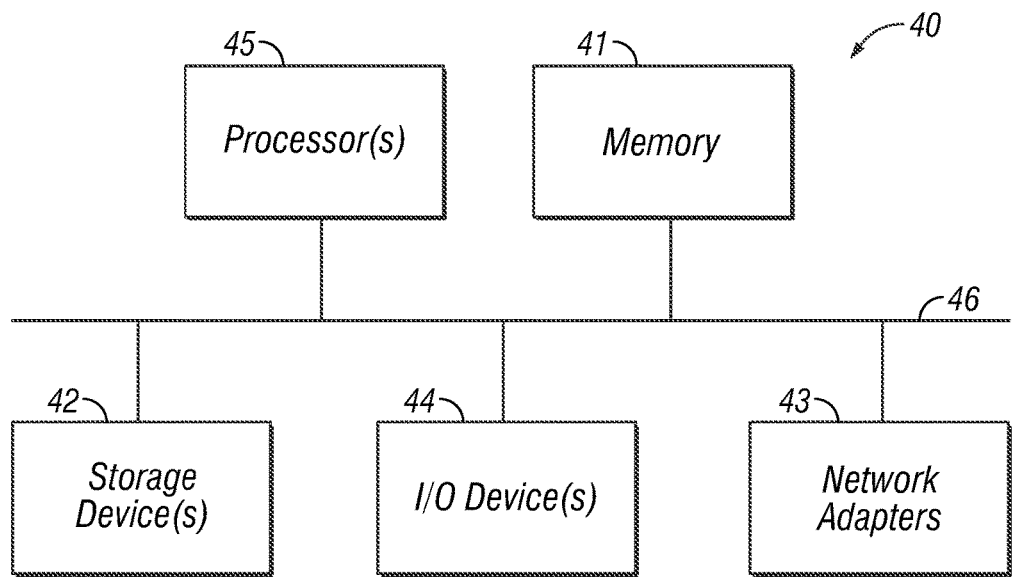
FIG. 8 is a block schematic diagram showing a machine in the example form of a computer system within which a set of instructions for causing the machine to perform one or more of the methodologies discussed herein may be executed.

FIG. 8 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 8, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for performing analysis on data generated by user interactions, comprising:
    providing a processor executing instructions for receiving text information from at least one interaction between a user and an agent;
    said processor text mining said interaction information to extract personal information relating to said user automatically;
    said processor using a topic model to extract lines from said text information to reduce a number of dimensions required to represent the text, wherein all information of interest is highly pronounced, and wherein a resulting lower dimensional representation of the text allows significantly faster computations;
    said processor extracting said lines of text as anchored text lines that are indicative of personal information that is present in the anchored text lines;
    said processor identifying said anchored text lines by checking for specific keywords which are present when said user is mentioning personal information during said interaction;

said processor applying a statistical technique to said anchored text lines to discover information present in the anchored text lines;

said processor using a k nearest neighbor algorithm to discover said information present in the anchored text lines;

said processor representing said text in a topic space with a score along each axis to indicate an extent to which said text contains personal information about said user;

upon receiving a new data point, which optionally comprises an anchored text line from said text, said processor picking the k closest points to said new data point, determining a predominant class among classes in the k closest points, and assigning said predominant class to said new data point;

said processor assigning a user corresponding to said text to at least one class based on said identified personal information; and said processor classifying said user based upon said extracted lines of text.

2. The method of claim 1, further comprising:
said processor extracting said interaction information from any of a network and said agent.

3. The method of claim 1, further comprising:
said processor initially transcribing said interaction into text.

4. The method of claim 1, wherein said personal information topic space comprises any of marital status, age, date of birth, travel plans, anniversary date, preferred brands, family related information, financial information, level of education, vehicles owned, location, health related information, level of familiarity with a specific area, and price consciousness.

5. The method of claim 1, further comprising:
said processor gathering data required to identify said personal information from any of said user's past interactions, a user profile, and from current interactions.

6. The method of claim 5, further comprising:
said processor continuously generating said user profile by evaluating a plurality of different sets of said data collected across a plurality of channels, multiple data sources, and unique identifiers comprising all of unique data which corresponds to unique identification parameters of the user, aggregate data, transaction data, and said interaction data, said profile including information that uniquely identifies a user as well as the user's previous interaction experience and personal information which is used to classify the user.

7. The method of Claim 1, further comprising:
said processor assigning texts a value of 'No Segment' class if personal information about the user cannot be extracted from said text.

8. The method of claim 1, further comprising:
said processor associating an identification with said user.

9. The method of claim 8, wherein said identification comprises any of a user ID associated with the user, a phone number, and an email address.

10. The method of claim 8, further comprising:
once said user has been identified, said processor tailoring interactions with the user based on the identified personal information.

11. An apparatus for performing analysis on data generated by user interactions, comprising:
a processor executing instructions for receiving text information from at least one interaction between a user and an agent;

said processor text mining said interaction information to extract personal information relating to said user automatically;

said processor using a topic model to extract lines from said text information to reduce a number of dimensions required to represent the text, wherein all information of interest is highly pronounced, and wherein a resulting lower dimensional representation of the text allows significantly faster computations;

said processor extracting said lines of text as anchored text lines that are indicative of personal information that is present in the anchored text lines;

said processor identifying said anchored text lines by checking for specific keywords which are present when said user is mentioning personal information during said interaction;

said processor applying a statistical technique said anchored text lines to discover information present in the anchored text lines;

said processor using a k nearest neighbor algorithm to discover said information present in the anchored text lines;

said processor representing said text in a topic space with a score along each axis to indicate an extent to which said text contains personal information about said user;

upon receiving a new data point, which optionally comprises an anchored text line from said text, said processor picking the k closest points to said new data point, determining a predominant class among classes in the k closest points, and assigning said predominant class to said new data point;

said processor assigning a user corresponding to said text to at least one class based on said identified personal information; and said processor classifying said user based upon said extracted lines of text.

* * * * *